US012178308B2

(12) United States Patent
Armstrong

(10) Patent No.: US 12,178,308 B2
(45) Date of Patent: Dec. 31, 2024

(54) CONVERTIBLE CHILD SEAT DEVICE WITH POCKETS

(71) Applicant: Breana Monique Armstrong, Scottdale, GA (US)

(72) Inventor: Breana Monique Armstrong, Scottdale, GA (US)

(*) Notice: Subject to any disclaimer, the term of this patent is extended or adjusted under 35 U.S.C. 154(b) by 0 days.

(21) Appl. No.: 17/683,923

(22) Filed: Mar. 1, 2022

(65) Prior Publication Data
US 2022/0273091 A1 Sep. 1, 2022

Related U.S. Application Data

(60) Provisional application No. 63/155,065, filed on Mar. 1, 2021.

(51) Int. Cl.
A45F 4/02 (2006.01)
A45F 3/04 (2006.01)
(Continued)

(52) U.S. Cl.
CPC .............. A45F 4/02 (2013.01); A45F 3/04 (2013.01); A45F 3/14 (2013.01); B60N 2/2851 (2013.01);
(Continued)

(58) Field of Classification Search
CPC ..... B60R 2011/0015; B60N 2002/2896; A45F 2004/026; A45F 2002/026
See application file for complete search history.

(56) References Cited

U.S. PATENT DOCUMENTS 5,785,383 A * 7/1998 Otero .................. A47D 1/02
297/378.12
6,139,100 A * 10/2000 Baskin-Lockman ..............
B60N 2/2881
411/509
(Continued)

FOREIGN PATENT DOCUMENTS

CN 208227001 U * 12/2018
FR 2805135 A1 * 8/2001 ............... A45F 3/04
(Continued)

OTHER PUBLICATIONS

So, Adrienne. "Can Outdoor Gear Experts Make A Better Kid's Car Seat," Wired, Oct. 24, 2018, (9 pages), [Retrieved from the Internet Apr. 6, 2022] <URL: https://www.wired.com/story/wayb-pico-design-a-better-car-seat/>.
(Continued)

Primary Examiner — Scott T McNurlen
(74) Attorney, Agent, or Firm — Alston & Bird LLP

(57) ABSTRACT

Various embodiments of the present invention are directed to a convertible child seat configured to be operable between a deployed orientation as a child seat to be secured to a vehicle and a folded orientation as a child supply bag. According to various embodiments, the child seat comprises a seat portion configured for receiving the bottom of a child, a backrest portion pivotally attached to an end of the seat portion or otherwise attached to the seat portion in a manner that permits selective rotation of both portions relative to one another, and configured for supporting the back of the child, and a plurality of pockets secured to the seat portion. In certain embodiments, the backrest portion includes one or more pockets.

19 Claims, 9 Drawing Sheets

(51) Int. Cl.
*A45F 3/14* (2006.01)
*B60N 2/28* (2006.01)
*B60N 2/75* (2018.01)

(52) U.S. Cl.
CPC ........ *B60N 2/787* (2018.02); *A45F 2003/142* (2013.01); *A45F 2004/026* (2013.01); *B60N 2002/2896* (2013.01)

(56) References Cited

U.S. PATENT DOCUMENTS

| | | | | |
|---|---|---|---|---|
| 6,913,176 | B1* | 7/2005 | Buscemi | A45F 5/00 |
| | | | | 224/665 |
| 8,960,793 | B2* | 2/2015 | Gillett | B60N 2/2872 |
| | | | | 297/411.3 |
| 9,573,528 | B1* | 2/2017 | Line | B60R 7/005 |
| 10,406,957 | B2* | 9/2019 | Faruque | B60N 2/90 |
| 11,124,095 | B2* | 9/2021 | Douglas | B60N 2/005 |
| 2004/0074937 | A1* | 4/2004 | Thomas | A45F 3/04 |
| | | | | 224/628 |
| 2006/0226636 | A1* | 10/2006 | Wilson | B60N 2/2845 |
| | | | | 280/647 |
| 2011/0133533 | A1 | 6/2011 | Herzberg | |
| 2012/0280553 | A1 | 11/2012 | Barker | |
| 2012/0326476 | A1* | 12/2012 | Runk | B60N 2/2851 |
| | | | | 297/250.1 |
| 2018/0146794 | A1 | 5/2018 | Torres | |
| 2019/0184862 | A1* | 6/2019 | Selly | B60N 2/286 |

FOREIGN PATENT DOCUMENTS

| | | | | |
|---|---|---|---|---|
| GB | 2436521 A | * | 10/2007 | ........... B60N 2/2803 |
| GB | 2446290 A | * | 8/2008 | ............... A45F 4/02 |
| KR | 200191560 Y1 | * | 8/2000 | |
| KR | 10-2197673 B1 | | 12/2020 | |

OTHER PUBLICATIONS

"2 in 1 Fashion Waterproof Diaper Bag Backpack Baby Carrier Portable Baby Chair Seat Carry-On Mummy Bag Organizer Totes," Wish, (3 pages), (online) [Retrieved from the Internet Apr. 15, 2022] <URL: https://www.wish.com/product/2-in-1-fashion-waterproof-diaper-bag-backpack-baby-carrier-portable-baby-chair-seat-carry-on-mummy-bag-organizer-totes-5d411ccc49ce1f451cadff3c?hide_login_modal=true&share=web>.

"Milan S (Special Edition 2021) Diaper Bag Backpack," Upper Brand, (11 pages), [Retrieved from the Internet Apr. 15, 2022] <URL: https://upperbags.com/products/milan-s-new-special-edition-backpack>.

International Search Report and Written Opinion for International Application No. PCT/US2022/018297, dated Jun. 28, 2022, (11 pages), Korean Intellectual Property Office, Republic of Korea.

* cited by examiner

US 12,178,308 B2

CONVERTIBLE CHILD SEAT DEVICE WITH POCKETS

CROSS-REFERENCE TO RELATED APPLICATIONS

This application claims the benefit of and priority to U.S. Provisional Application Ser. No. 63/155,065, titled "CONVERTIBLE CHILD SEAT DEVICE WITH POCKETS," filed Mar. 1, 2021, which is incorporated by reference herein in its entirety.

TECHNOLOGICAL FIELD

The present disclosure relates to child safety seat device and in certain embodiments, to convertible child seat device that includes two or more pockets.

BACKGROUND

Child safety seat and child supply bag are essentials for parents of young children. Child safety seats, commonly referred to as child seat, are designed to protect children in vehicles. Child supply bags, commonly referred to as diaper bags, are designed to store children's supplies (e.g., diapers, wet wipes, baby feeding bottles, blankets, and the like) for transportation. Many child seats are heavy and bulky. Similarly, diaper bags become heavy when filled with a host of a child's supplies needed to keep the child comfortable. Accordingly, many parents are faced with the challenge of carrying a child seat, a diaper bag, and the parent's personal items (e.g., purse, wallet, cell phone, or the like). It would be advantageous and convenient to have a combination child seat device and supply bag that is easy to transport. Through applied effort, ingenuity, and innovation, many of these identified problems have been solved by developing solutions that are included in embodiments of the present disclosure, many examples of which are described in detail herein.

BRIEF SUMMARY

Various embodiments of the present disclosure are directed to a convertible child seat. According to various embodiments, the child seat comprises: a seat portion configured for receiving the bottom of a child; a backrest portion configured for supporting the back of the child, wherein the backrest portion is pivotally secured to an end of the seat portion and extending upwardly therefrom or otherwise attached to the seat portion in a manner that permits selective rotation of both portions relative to one another; and a plurality of pockets secured to the seat portion, wherein the child seat is operable between a deployed orientation as a child seat to be secured to a vehicle seat and a folded orientation as a child supply bag.

According to certain embodiments, the child seat comprises a seat portion configured for receiving the bottom of a child; a backrest portion configured for supporting the back of the child, wherein the backrest portion is pivotally secured to an end of the seat portion and extending upwardly therefrom or otherwise attached to the seat portion in a manner that permits selective rotation of both portions relative to one another; and a plurality of pockets secured to the backrest portion, wherein the child seat is operable between a deployed orientation as a child seat to be secured to a vehicle seat and a folded orientation as a child supply bag.

In some embodiments, the child seat may comprise a harness secured to the backrest portion, wherein the harness includes a first harness strap and a second harness strap extending from a front surface of the backrest portion, wherein the first harness strap and the second harness strap may each be removable and configured to be attachable to a back surface of the backrest portion, to serve as a shoulder strap when the child seat is in its folded orientation as a child supply bag.

In various embodiments, the child seat may include a plurality of wheels operatively coupled to a lower end of the backrest portion, and a handle attached to an upper end of the backrest portion, wherein a user may roll the child seat along the ground either in its deployed orientation or folded orientation. In some embodiments, the handle may be removable and configured to be attachable to the front surface of the backrest portion, wherein the handle may function as a headrest for a child positioned within the child seat when in its folded orientation.

In some embodiments, the convertible child seat comprises: a seat portion configured for receiving the bottom of a child; a backrest portion configured for supporting the back of the child, the backrest portion being pivotally secured to an end of the seat portion and extending upwardly therefrom; and a plurality of pockets, the plurality of pockets being secured to the seat portion, wherein, the child seat is operable between a deployed orientation as a child seat to be secured to a vehicle and a folded orientation as a child supply bag. In some embodiments, the child seat further comprises: a harness secured to the backrest portion of the child seat. In some embodiments, the harness includes a first harness strap and a second harness strap extending from a front surface of the backrest portion. In some embodiments, the first harness strap and the second harness strap are removable. In some embodiments, the first harness strap and the second harness strap are configured to be attachable to a back surface of the backrest portion, wherein the first and second harness straps may each serve as a shoulder strap. In some embodiments, the child seat further comprises a plurality of wheels operatively coupled to a lower end of the backrest portion to allow a user to roll the child seat on the ground. In some embodiments, the child seat further comprises a handle attached to an upper end of the backrest portion to allow a user to grip and pull the child seat. In some embodiments, the handle is removable. In some embodiments, the handle includes a fastener member configured to be attached to a corresponding fastener member disposed on the front surface of the backrest portion, wherein the handle may serve as a headrest for a child positioned within the child seat. In some embodiments, the child seat further comprises a pair of detachable arm rests attached to the seat portion. In some embodiments, the seat portion defines at least one cup holder recess. In some embodiments, a fastener is disposed between the seat portion and the backrest portion for selectively securing the child seat in a folded state when in its folded orientation. In some embodiments, the plurality of pockets each comprise a plurality of attached panels defining an interior storage space having an access opening. In some embodiments, at least one of the plurality of pockets includes a detachable outside layer. In some embodiments, at least one of the plurality of pockets is lined with insulating material. In some embodiments, the seat portion comprise an front wall, a back wall, a right side wall, and a left side wall, wherein a first left pocket is disposed on the left side wall, and a first right pocket is disposed on the right side wall. In some embodiments, the right side wall comprises a second right pocket disposed on the first right pocket. In some embodiments, the upper, lower, left side, and right side walls of the seat portion collectively define an interior storage compartment. In some embodiments, the backrest portion includes at least one pocket disposed thereon.

In some embodiments, the convertible child seat comprises: a seat portion configured for receiving the bottom of a child; a backrest portion configured for supporting the back of the child, the backrest portion pivotally secured to an end of the seat portion and extending upwardly therefrom; and a plurality of pockets, the plurality of pockets being secured to the backrest portion, wherein, the child seat is operable between a deployed orientation as a child seat to be secured to a vehicle and a folded orientation as a child supply bag. In some embodiments, the child seat further comprises a harness secured to the backrest portion of the child seat. In some embodiments, the harness includes a first harness strap and a second harness strap extending from a front surface of the backrest portion. In some embodiments, the first harness strap and the second harness strap are removable. In some embodiments, the first harness strap and the second harness strap are configured to be attachable to a back surface of the backrest portion, wherein the first and second harness straps may each serve as a shoulder strap. In some embodiments, the child seat further comprises a plurality of wheels operatively coupled to a lower end of the backrest portion to allow a user to roll the child seat on the ground. In some embodiments, the child seat further comprises a handle attached to an upper end of the backrest portion to allow a user to grip and pull the child seat. In some embodiments, the handle is removable. In some embodiments, the handle includes a fastener member configured to be attached to a corresponding fastener member disposed on the front surface of the backrest portion, wherein the handle may serve as a headrest for a child positioned within the child seat. In some embodiments, the child seat further comprises a pair of detachable arm rests attached to the seat portion. In some embodiments, the seat portion defines at least one cup holder recess. In some embodiments, a fastener is disposed between the seat portion and the backrest portion for selectively securing the child seat in a folded state when in its folded orientation. In some embodiments, the plurality of pockets each comprise a plurality of attached panels defining an interior storage space having an access opening. In some embodiments, at least one of the plurality of pockets includes a detachable outside layer. In some embodiments, at least one of the plurality of pockets is lined with insulating material. In some embodiments, the seat portion includes at least one pocket disposed thereon. In some embodiments, the seat portion comprise an front wall, a back wall, a right side wall, and a left side wall, wherein a first left pocket is disposed on the left side wall, and a first right pocket is disposed on the right side wall. In some embodiments, the right side wall comprises a second right pocket disposed on the first right pocket. In some embodiments, the upper, lower, left side, and right side walls of the seat portion collectively define an interior storage compartment.

In some embodiments, a method of using the convertible child seat comprises the steps of: providing a convertible child seat in a folded orientation, the convertible child seat comprising: a seat portion configured for receiving the bottom of a child; a backrest portion configured for supporting the back of the child, the backrest portion being pivotally secured to an end of the seat portion and extending upwardly therefrom; and a plurality of pockets, the plurality of pockets being secured to the seat portion and/or backrest portion, wherein, the child seat is operable between a deployed orientation as a child seat to be secured to a vehicle and a folded orientation as a child supply bag. The method further comprising positioning the child seat on a support surface; disengaging a closure mechanism securing the seat portion and the backrest portion together; and rotating the seat portion and the backrest portion away from each other.

In some embodiments, a method for using a convertible child seat comprises the steps of: providing a convertible child seat in a deployed orientation, the convertible child seat comprising: a seat portion configured for receiving the bottom of a child; a backrest portion configured for supporting the back of the child, the backrest portion being pivotally secured to an end of the seat portion and extending upwardly therefrom; and a plurality of pockets, the plurality of pockets being secured to the seat portion and/or backrest portion, wherein, the child seat is operable between a deployed orientation as a child seat to be secured to a vehicle and a folded orientation as a child supply bag; The method further comprising rotating the seat portion and the backrest portion towards each other, such that the seat portion and the backrest portion are proximate to each other.

In some embodiments, the convertible child seat comprises: a first seat portion configured for receiving the bottom of a child; a first backrest portion configured for supporting the back of the child, the first backrest portion being pivotally secured to an end of the first seat portion and extending upwardly therefrom; a first plurality of pockets being secured to the first seat portion and/or the first backrest portion; a second seat portion configured for receiving the bottom of a child; a second backrest portion configured for supporting the back of the child, the second backrest portion being pivotally secured to an end of the second seat portion and extending upwardly therefrom; and a second plurality of pockets being secured to the second seat portion and/or the second backrest portion, wherein: the first backrest portion and the second backrest portion are configured for being releasably secured to one another.

BRIEF DESCRIPTION OF THE DRAWINGS

Reference will now be made to the accompanying drawings which are not necessarily drawn to scale, and wherein.

DETAILED DESCRIPTION

Various embodiments of the present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Various embodiments are directed to a convertible child seat. According to various embodiments, the child seat generally comprises a seat portion and a backrest portion. The backrest portion may be pivotally secured to the seat portion or otherwise attached to the seat portion in a manner that permits selective rotation of both portions relative to one another, such that the child seat may be folded into a compact and portable orientation. In its deployed orientation, the seat portion and the backrest portion may be dimensioned to receive and support a child positioned therein.

In various embodiments, the child seat comprises a plurality of storage pockets configured to store a variety of children's items (e.g., diapers, sippy cups, wet wipes, pacifiers, blankets, baby clothes, baby feeding bottles, baby food, snacks, and/or the like) and the parent's items (e.g., purse, wallet, cell phone, iPad, charger, and/or the like), such that when the child seat is in its folded orientation, it may be used as a child supply bag.

In certain embodiments the child seat comprises a plurality of wheels and a handle to allow a user to roll the child seat along the ground in either its folded orientation as a child supply bag or deployed orientation as a child seat. In various embodiments, the child seat includes a pair of shoulder straps to permit a user to carry like a backpack.

Convertible Child Seat

Figure 1:
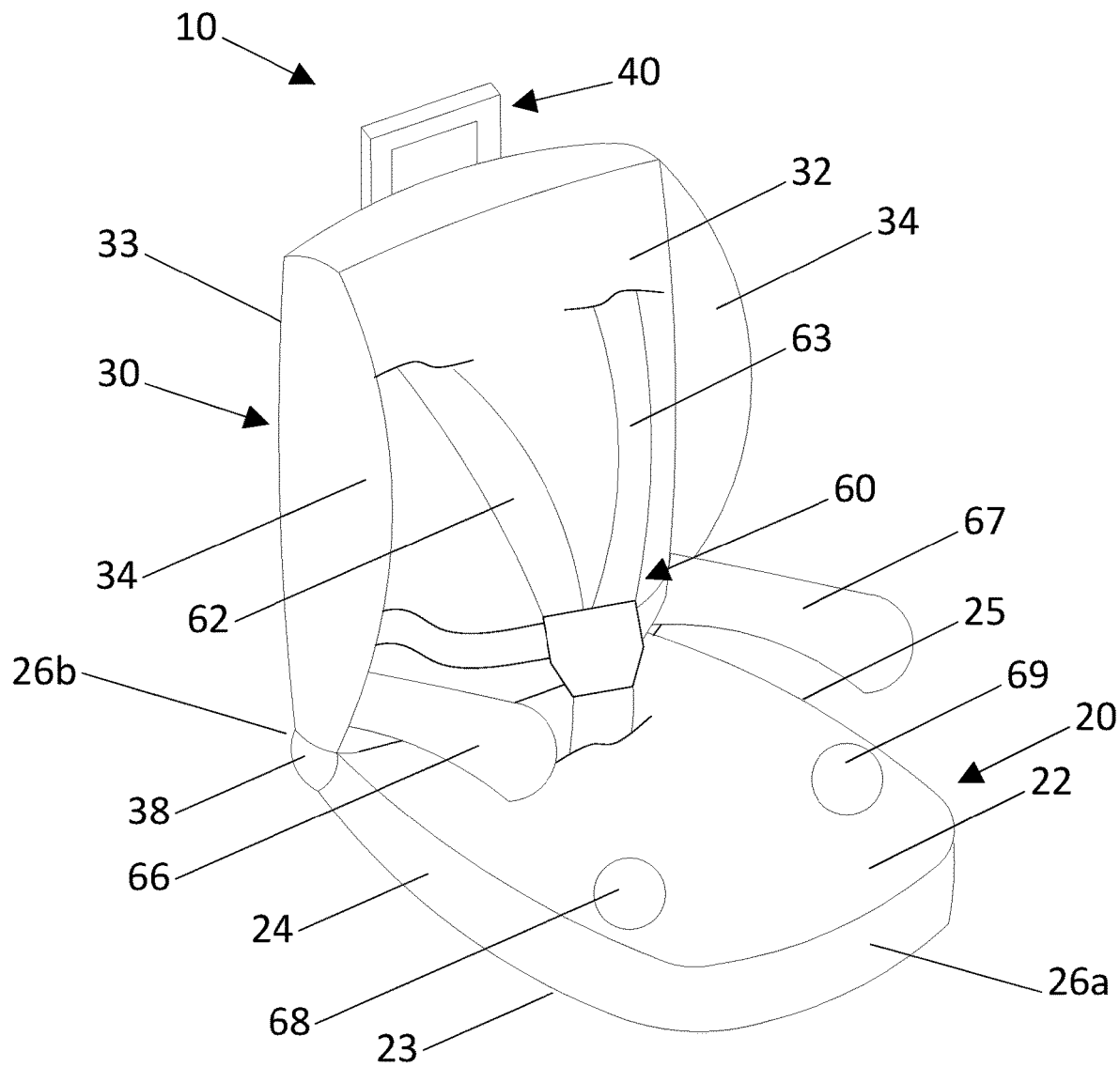
FIG. 1 shows a perspective view of a convertible child seat in a deployed orientation according to one embodiment of the present disclosure.

FIG. 1 illustrates a convertible child seat 10 according to various embodiments of the present disclosure. In the illustrated embodiment, the child seat 10 comprises a seat portion 20 and a backrest portion 30. The backrest portion 30 may be pivotally secured to an end of the seat portion 20 or otherwise attached to the seat portion 20 in a manner that permits selective rotation of both portions relative to one another. Additionally, as described in detail below, the seat portion 20 may comprise a plurality of pockets.

FIG. 1 illustrates the child seat 10 in a deployed orientation as a child seat configured to be secured to a vehicle seat (not shown). In the embodiment of FIG. 1, the seat portion 20 and the backrest portion 30 may be dimensioned to receive a child. As depicted in FIG. 1, the seat portion 20 may include an upper surface 22 configured for supporting the bottom of a child, a lower surface 23 configured for resting on a support surface (e.g., a vehicle seat), a left side wall 24 (see also FIG. 4), a right side wall 25 (see also FIG. 4), a front wall 26a (see also FIG. 4), and a back wall 26b (see also FIG. 4). The seat portion 20 may be formed from fabric material (e.g., nylon, polyester, and the like), vinyl, leather, or other suitable materials. In addition, the seat portion 20 may be substantially flat, contoured, or other suitable designs. In various embodiments, the seat portion 20 may include a frame (not shown). In some embodiments, a cushion (not shown) may be attached to the upper surface 22 of the seat portion 20 to provide added support for a child positioned therein. In certain embodiments the cushion and/or frame may be removable.

As mentioned, the child seat 10 may in certain embodiments also include a backrest portion 30. With reference to FIG. 1, the backrest portion 30 may comprise a front surface 32 for supporting the back of a child, and an opposing back surface 33. The backrest portion 30 may be formed from fabric material (e.g., nylon, polyester, and the like), vinyl, leather, or other suitable materials. Moreover, the backrest portion 30 may be substantially flat, contoured, or other suitable designs. As shown in FIG. 1, the backrest portion 30 may include a pair of side wing surfaces 34, although these surfaces may be eliminated in certain embodiments. In various embodiments, a cushion (not shown) may be attached to the front surface 32 to provide added support for a child positioned within the child seat 10. According to various embodiments, the cushion and/or wing surfaces may be removable. Still further, in some embodiments, the cushion may be adjustable in height relative to the backrest portion 30. Additionally, in various embodiments, the backrest portion 30 may include a frame (not shown).

Figure 2:
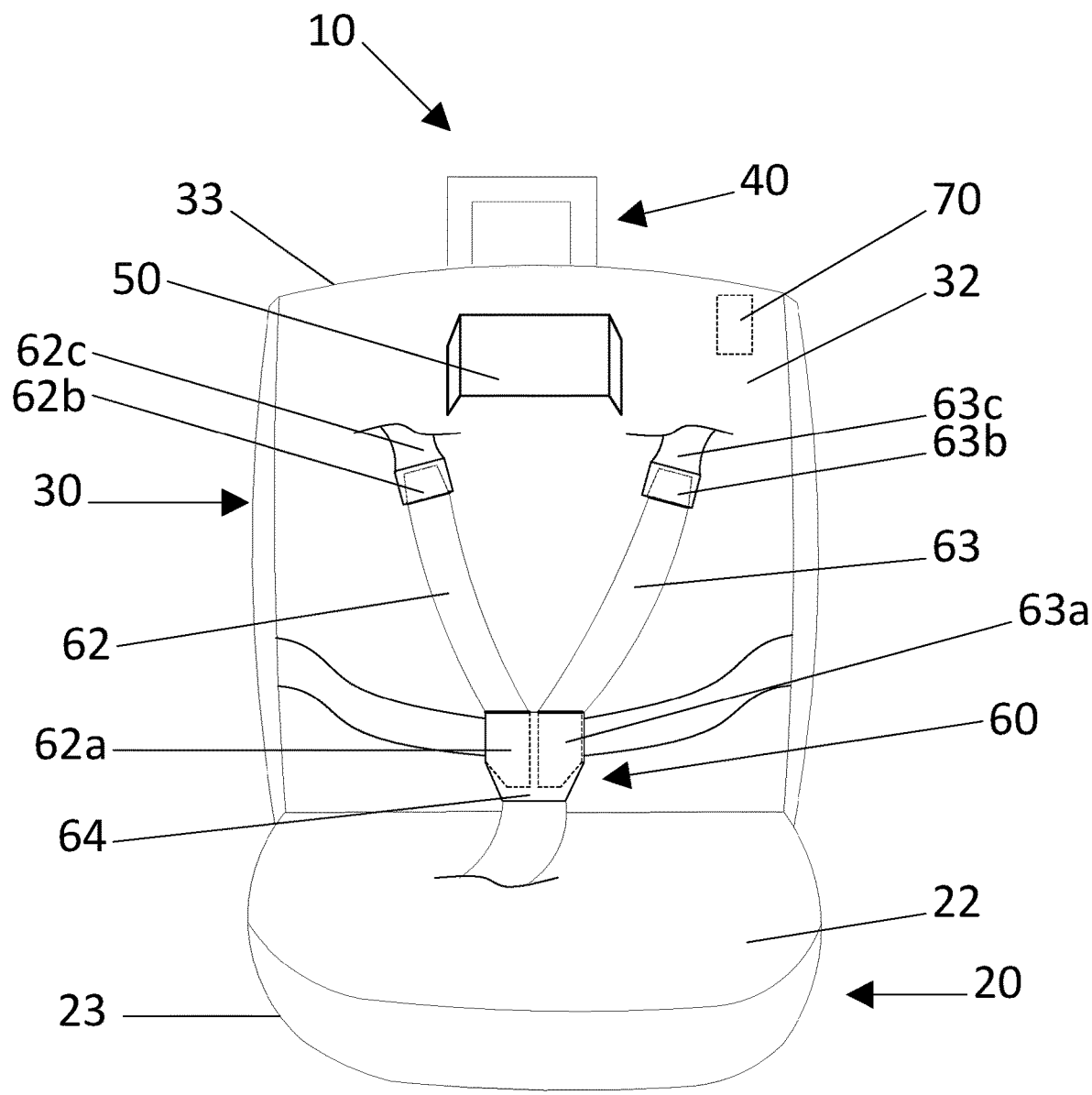
FIG. 2 shows a front view of a convertible child seat in a deployed orientation according to one embodiment of the present disclosure.

In various embodiments, the child seat 10 may include a belt path for a vehicle seat belt, to secure the child seat 10 to the vehicle seat. With reference to FIG. 2 (also showing the child seat 10 in a deployed orientation), the backrest portion 30 of the child seat 10 may define at least one opening 70 (see also FIG. 6) configured such that a vehicle seat belt may be threaded therethrough and fastened to the vehicle seat. In some embodiments, the backrest portion 30 may include one or more safety straps (not shown) extending therefrom and configured to be fastened (e.g. latched) to a vehicle seat.

As illustrated in FIG. 2, various embodiments of the child seat 10 may comprise a harness 60 configured to secure a child positioned therein. As shown in FIG. 2, the harness 60 may comprise a first harness strap 62 and a second harness strap 63 that are each fastened to the front surface 32 of the backrest portion 30 and extending therefrom. A female buckle member 64 secured to the seat portion 20 may be configured to receive a corresponding first male buckle member 62a and a corresponding second male buckle member 63a disposed on the first and second harness straps 62, 63 respectively. As shown in FIG. 2, the harness 60 may be a five-point harness, however, the harness 60 may be a three-point harness, or other suitable harness designs.

In various embodiments, the first and second harness straps 62, 63 may each be configured to be independently utilized as a backpack strap when the child seat 10 is in its folded orientation. In one example embodiment, the first and second harness straps 62, 63 may be removable and configured to be selectively reattachable (e.g., via hook-and-loop or other type attachment mechanisms) to the back surface 33 of the backrest portion 30. As shown in FIG. 2, the front surface 32 of the backrest portion may comprise a pair of fastener members 62c, 63c (e.g., female members of a buckle, or the like), each configured for receiving a corresponding fastener member 62b and corresponding fastener member 63b (e.g., male members of a buckle, or the like), attached to the first and second harness straps 62, 63 respectively.

Figure 3:
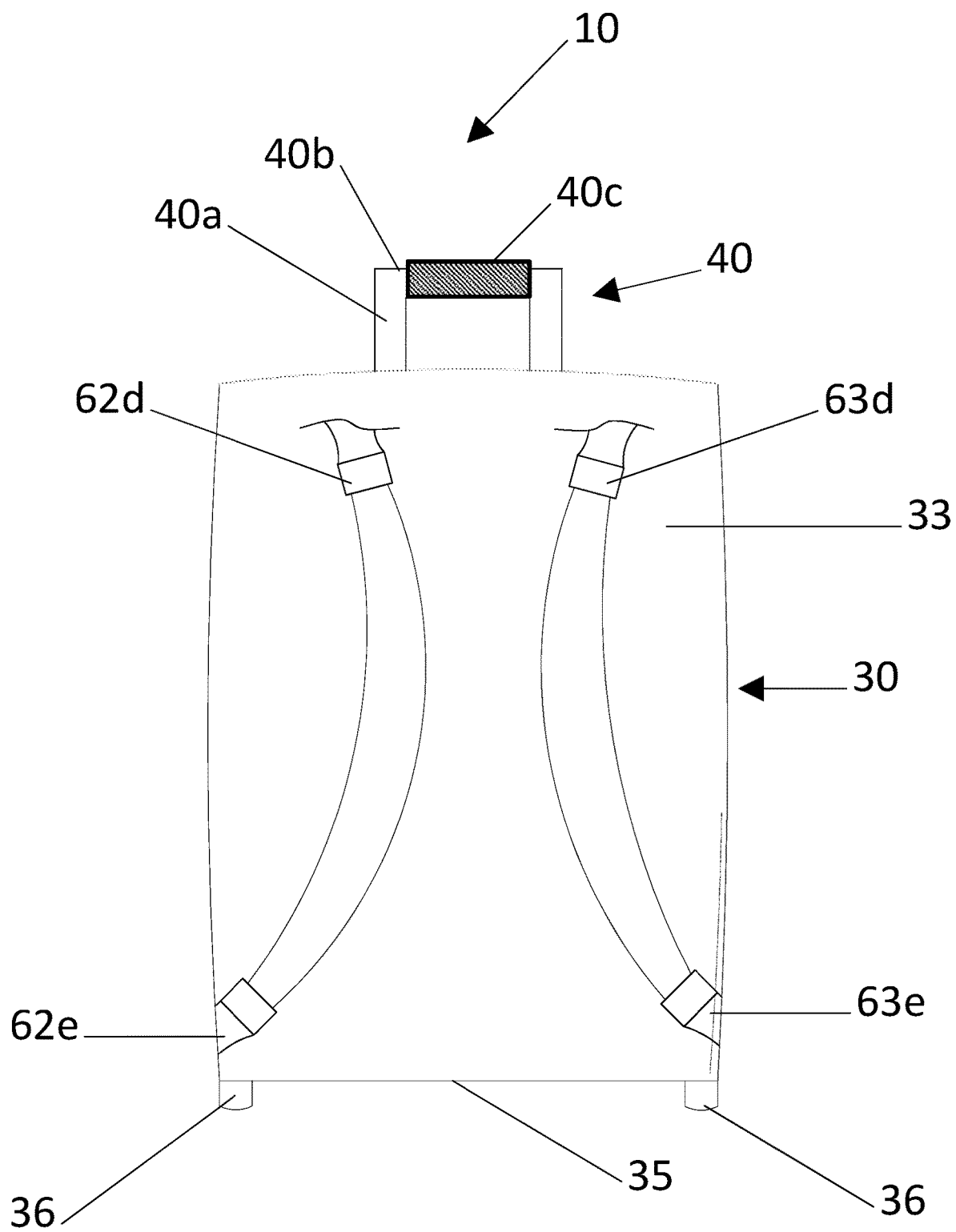
FIG. 3 shows a back view of a convertible child seat in a deployed orientation according to one embodiment of the present disclosure.

As shown in FIG. 3, the back surface 33 of the backrest portion 30 may comprise a pair of fastener members 62d, 63d (e.g., similar to the front surface fastener members 62c, 63c) configured also for receiving the corresponding fastener members 62b, 63b of the first and second harness straps 62, 63. Furthermore, the back surface 33 may comprise a pair of female buckle members 62e, 63e configured to receive the first and second male buckle members 62a, 63a of the harness straps 62, 63. In another example embodiment, the backrest portion 30 may define a pair of openings (not shown) for threading the first and second harness straps 62, 63 through and securing on the back surface 33 of the backrest portion 30, such that the first and second harness 62, 63 may serve as shoulder straps when the child seat 10 is in its folded orientation as a child supply bag. According to various embodiments, the harness 60 may further comprise a harness adjuster (not shown). In some embodiments, the harness 60 may include a harness chest clip (also not shown).

In various embodiments, the child seat 10 may include a rolling mechanism. As shown in the embodiment of FIG. 3, the child seat 10 may comprise a plurality of wheels 36 operatively coupled to a lower end 35 of the backrest portion 30 to allow the child seat 10 to be rolled by a user along the ground. In various embodiments, the wheels 36 may be swivel wheels, however, the wheels may be rigid wheels or other types of wheels. Moreover, the wheels 36 may be alloy wheels, steel wheels, or other suitable wheels. In some embodiments, the wheels 36 may include a locking mechanism for selectively locking the wheels 36 to prevent movement. In certain embodiments, the wheels 36 may be operatively attached to the seat portion 20. Yet, in some embodiments, the child seat 10 may comprise other rolling mechanisms.

In various embodiments, as depicted in FIG. 3, the child seat 10 may include a handle 40 to allow the child seat 10 to be pulled or otherwise moved by a user (in conjunction with the wheels 36 as described above). In various embodiments the handle 40 may be attached to the backrest portion 30. As shown in FIG. 3, the handle 40 may include a frame 40a extending upwardly from the backrest portion 30 and having a gripping portion 40b. As illustrated in FIG. 3, the gripping portion 40b may be at least partially encased in a padding 40c. The frame 40a may be substantially rectangular as shown in FIG. 3, however, the frame 40a may be T-shaped or other suitable shapes. Additionally, the frame 40a may be formed from plastic, metal, or other materials. In some embodiments, the frame 40a may be a telescoping frame. In certain embodiments, the handle 40 may be configured to define an interior storage compartment for storing articles such as a cell phone, and/or the like. In some embodiments, the handle 40 may be configured to function as a solar panel, such that it may be used to charge a cell phone.

In various embodiments, the handle 40 may be configured to be utilized as a headrest for supporting the head of a child positioned within the child seat 10 when in its deployed orientation. In one example embodiment, the padding 40c may be removable from the gripping portion 40b. Furthermore, the padding 40c may comprise a fastener (e.g. hook-and-loop fastener) for securing on the front surface 32 of the backrest portion 30 to serve as a headrest 50, as shown in FIG. 2. In another example embodiment, the gripping portion 40b may be removable and configured to be releasably attached to the front surface 32 of the backrest portion 30. The gripping portion 40b may include a fastener member configured to be attached to a corresponding fastener member disposed on the front surface 32 of the backrest portion 30. Yet, in an example embodiment, the front surface 32 of the backrest portion 30 may define one or more recess (not shown) configured to receive the handle 40, such that the gripping portion 40b of the handle 40 rests on the backrest portion 30, to serve as a headrest.

According to various embodiments, the child seat 10 may include one or more arm rests for supporting the arms of a child. As shown in FIG. 1, a first arm rest 66 and a second arm rest 67 may extend outwardly from the backrest portion 30 of the child seat 10. In some embodiments, the first arm rest 66 and the second arm rest 67 may extend from the seat portion 20. In other embodiments, no arm rests may be provided. Additionally, according to various embodiments, the child seat 10 may comprise one or more cup holders. For example, as shown in FIG. 1, the seat portion 20 may define a recess on opposite sides configured to function as a first cup holder 68 and a second cup holder 69. In certain embodiments, the cup holders may be adjustable and/or retractable. In some embodiments, the one or more cup holders may be disposed on the first arm rest 66 and/or second arm rest 67.

Figure 4:
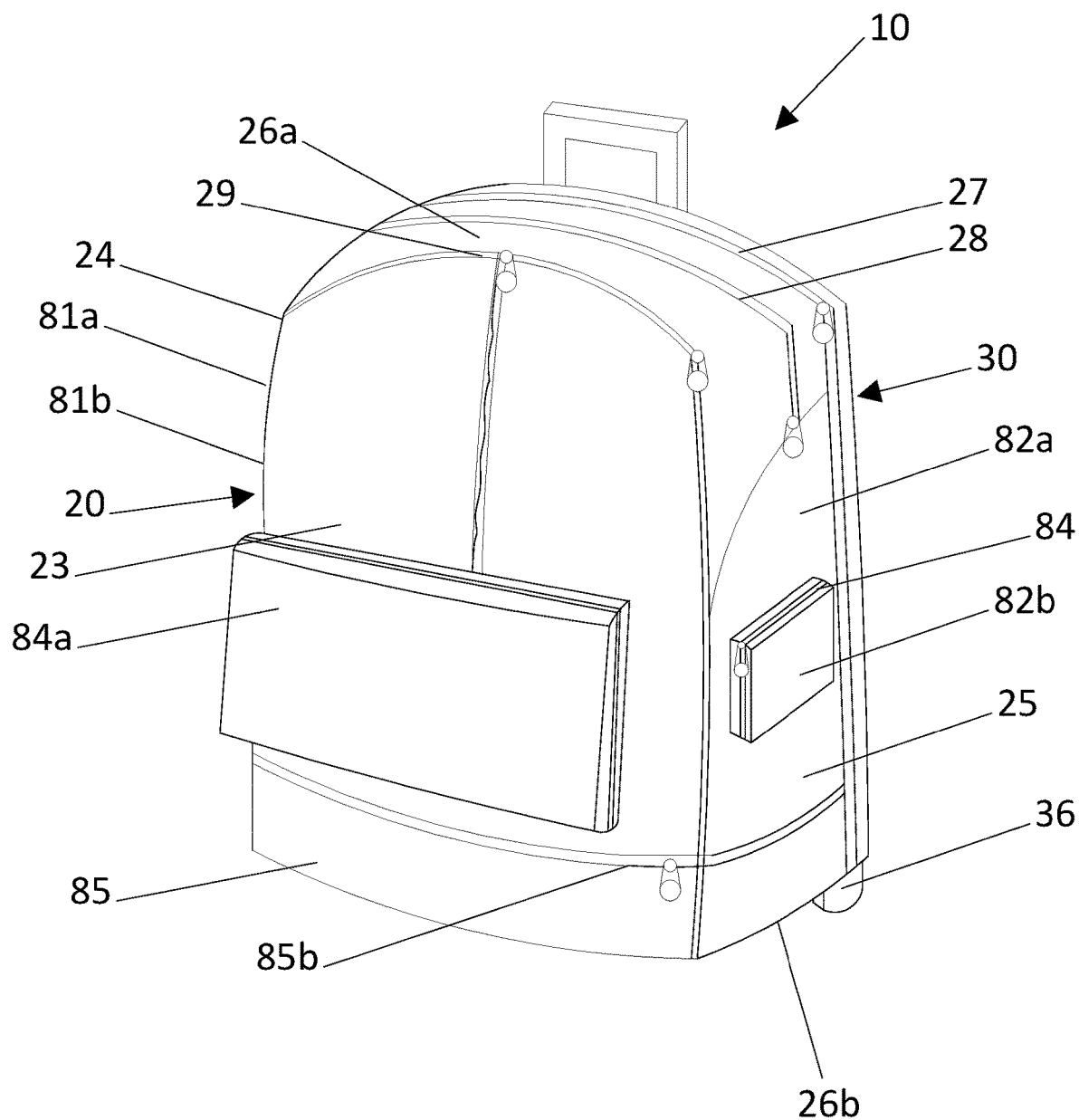
FIG. 4 shows a perspective view of a convertible child seat in a folded orientation according to one embodiment of the present disclosure.

FIG. 4 illustrates a folded orientation in which the child seat 10 is configured for use as a transportable and portable child supply bag. In the folded orientation, as shown in FIG. 4, the seat portion 20 and the backrest portion 30 are collapsed proximate to each other to form a compact unit. As noted above, the seat portion 20 and the backrest portion 30 may be pivotally secured or otherwise attached to the seat portion 20 in a manner that permits selective rotation of both portions relative to one another. In various embodiments, as illustrated in FIG. 1, a pivoting device 38 may be secured to the seat portion 20 and the backrest portion 30. In certain embodiments, as illustrated in FIG. 4, the seat portion 20 and the backrest portion 30 may be integrally formed. In various embodiments, a plurality of separate zippers or other closure mechanisms (e.g., hook, button, clasps, snaps, and/or the like) may be provided, so as to permit full rotation of the seat portion 20 and backrest portion 30 of the child seat relative to one another.

In various embodiments, a locking mechanism may be disposed between the seat portion 20 and the backrest portion 30 for selectively locking the child seat 10 in its folded orientation. In certain embodiments, a fastener may be utilized for securing the child seat 10 in its folded orientation. In the illustrated embodiment of FIG. 4, a zipper 27 or other closure mechanism (hook, button, clasps, snaps, and/or the like) may be disposed along the edges of the seat portion 20 and the backrest portion 30. In this manner, the child seat 10 may remain folded when the zipper 27 is closed and may be unfolded when the zipper 27 is open. The zipper 27 may be a closed end zipper, a molded plastic zipper, or other suitable zippers. In some embodiments, a hook-and-loop fastener or other fastening mechanisms may be utilized to keep the child seat in its folded orientation. Yet, in some embodiments, a locking mechanism and a fastener may be used in conjunction.

As noted above, a plurality of pockets may be disposed around the exterior of the seat portion 20 of the child seat 10. In an example embodiment, as shown in FIG. 4, the left side wall 24 of the seat portion 20 may have a first left pocket 81a disposed thereon and the right side wall 25 may have a first right pocket 82a disposed thereon. Additionally, the first left pocket 81a and the first right pocket 82a may each comprise a second left pocket 81b and a second right pocket 82b disposed thereon respectively. In various embodiments, the side pockets may comprise additional pockets disposed thereon. Yet, in various embodiments, the side pockets may comprise multiple pockets disposed thereon. The plurality of pockets may each comprise a plurality of attached panels defining an interior storage space having an access opening. As illustrated in FIG. 4, one or more of the plurality of pockets may include a closure mechanism 84 (e.g., zippers, hook, button, clasps, snaps, and/or other closure mechanisms) attached thereon to selectively conceal the access opening. In various embodiments, the access opening may be configured to remain open.

With reference to FIG. 4 still, the upper surface 22, lower surface 23, left side wall 24, right side wall 25, front wall 26a, and back wall 26b of the seat portion 20 may collectively define an interior space with one or more access openings defined along a plurality of edges. In various embodiments, a closure mechanism 28 (e.g., zippers, hook, button, clasp, snaps, and/or other closure mechanisms) may be disposed along a plurality of edges to selectively conceal the one or more access openings. In some embodiments, one or more panels (not shown) may be disposed and secured within the interior space, such that a plurality of compartments is defined therein. In various embodiments, the lower surface 23 may be cut along an upper edge and side edges to define an opening. In various embodiments, a closure mechanism 29 (e.g., zippers, hook, button, clasp, snaps, and/or other closure mechanisms) may be disposed around the upper edge and side edges of the lower surface 23, as shown in FIG. 4, so as to create embedded pockets. It should be understood that a plurality of separate zippers may also be provided, so as to permit full rotation of the seat portion 20 and backrest portion 30 of the child seat relative to one another. With reference to FIG. 4, the lower surface 23 may comprise a front pocket 84a disposed thereon. In various embodiments, the lower surface 23 may comprise additional pockets.

Figure 5:
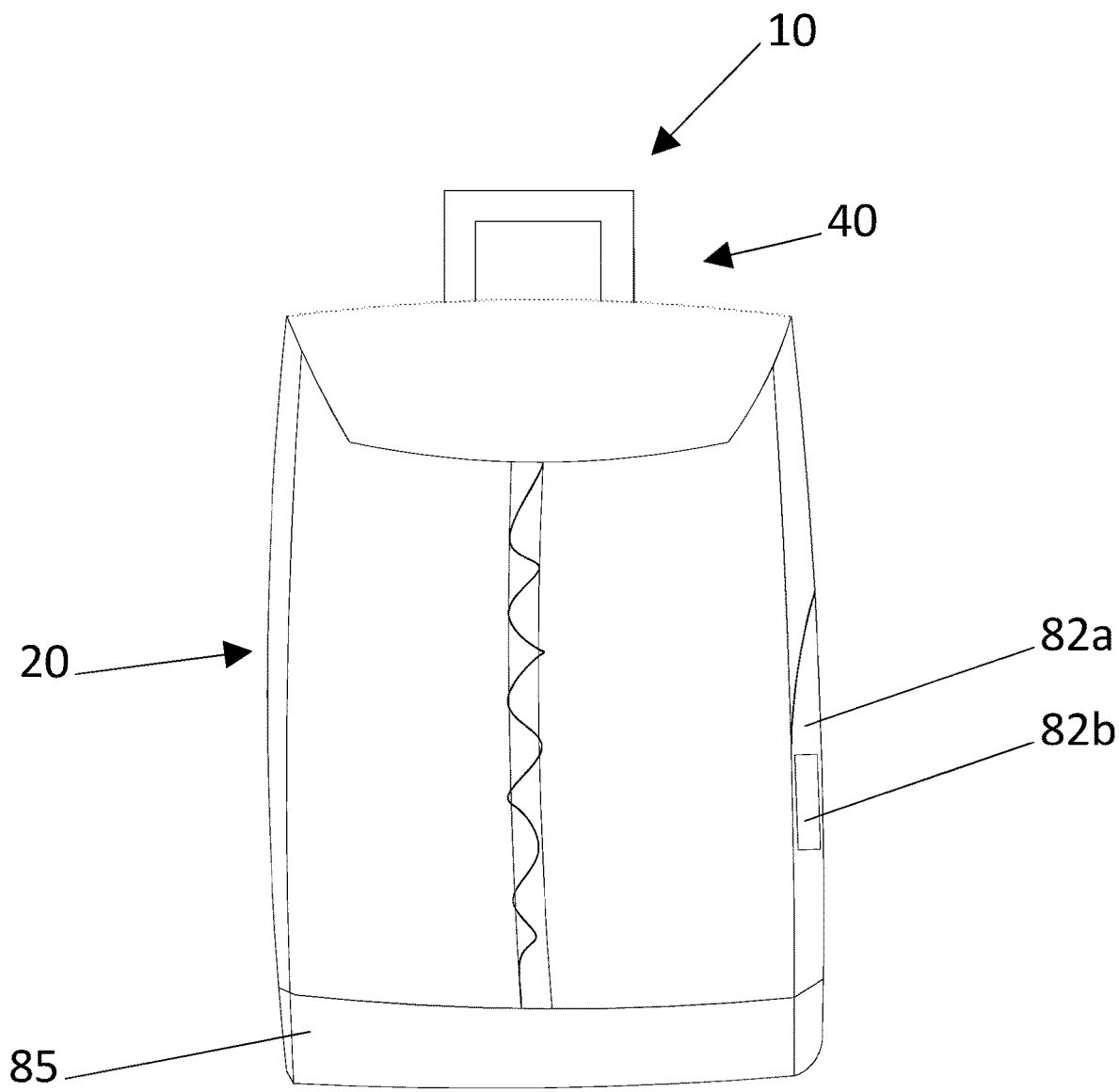
FIG. 5 shows a front view of a convertible child seat in a folded orientation according to one embodiment of the present disclosure.

In various embodiments, the plurality of pockets may be configured to receive articles of different shapes and dimensions, strategically positioned on the seat portion 20 to facilitate convenient access. In an example embodiment, as shown in FIG. 4 and FIG. 5, the second right pocket 82b may be substantially rectangular and have a width of approximately 6 inches, a length of approximately 8 inches, and a height of approximately 1.5 inches, such that a child supply of similar dimensions (e.g., a container of baby wipes) may be conveniently positioned therein by a user. Furthermore, a bottom pocket 85 lined with insulating material may be disposed on the lower end of the seat portion 20, to serve as a cooler compartment and/or warmer compartment. As shown in FIG. 4, the bottom pocket 85 may include a closure mechanism 85b (e.g., zippers, hook, button, clasp, snaps, and/or other closure mechanisms). Additionally, the first right pocket 82a may include a detachable outer layer configured for use as a blanket.

Figure 6:
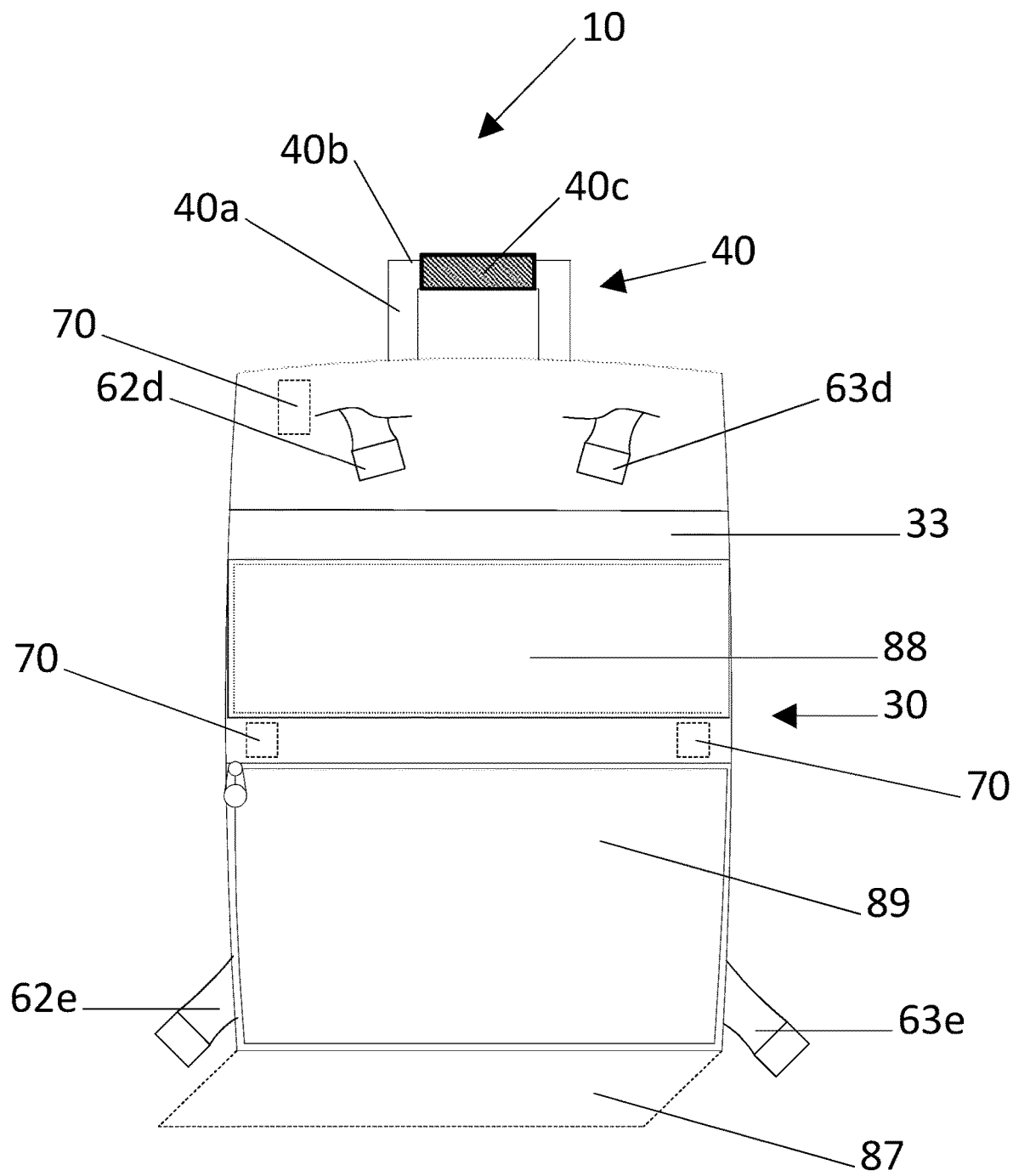
FIG. 6 shows a back view of a convertible child seat in a folded orientation according to one embodiment of the present disclosure.

In some embodiments, the backrest portion 30 may include one or more pockets secured thereon. In an example embodiment, as shown in FIG. 6, the back surface 33 of the backrest portion 30 may include a detachable panel 87 formed from material suitable for use as a diaper mat. In some embodiments, a closure mechanism is disposed on the sides such that the panel 87 may unfold as shown in FIG. 6. In certain embodiments, a closure mechanism (e.g., zippers, hook, button, clasp, snaps, and/or other closure mechanisms) may be additionally disposed on the bottom, such that the entire panel may be detached. Additionally, in some embodiments, a diaper pocket 89 may be disposed above the mat, such that articles such as ointments and wipes may be stored therein. In some embodiments, the diaper pocket may include a closure mechanism (e.g., zippers, hook, button, clasp, snaps, and/or other closure mechanisms). Additionally, the backrest portion 30 may include a back pocket 88 secured therein for receiving an ID label. Moreover, each pocket may be uniquely identified (or labeled).

In various other embodiments, the child seat 10 may comprise a seat portion 20 and a backrest portion 30. The backrest portion 30 being pivotally secured to an end of the seat portion 20 or otherwise attached to the seat portion 20 in a manner that permits selective rotation of both portions relative to one another. Additionally, a plurality of pockets may be disposed around the exterior of the backrest portion 30. In some embodiments, the backrest portion 30 may define an interior storage compartment having an access opening.

Various Other Embodiments

Figure 7:
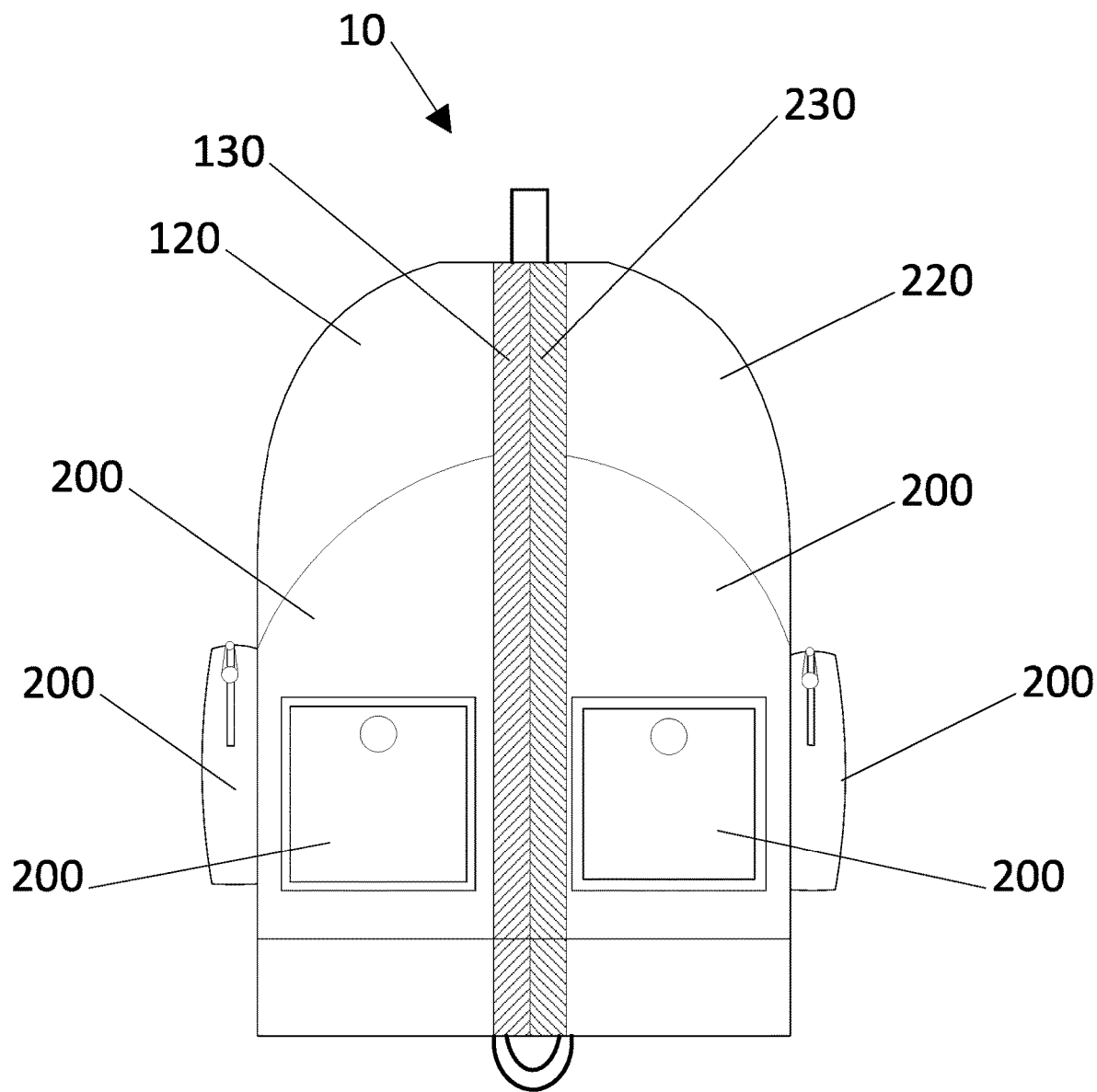
FIG. 7 shows a side view of a convertible child seat in a folded orientation according to one embodiment of the present disclosure.

In various embodiments, as shown in FIG. 7, the child seat 10 may comprise a first seat portion 120 and a first backrest portion 130 pivotally secured to the first seat portion 120 or otherwise attached to the first seat portion 120 in a manner that permits selective rotation of both portions relative to one another. A second seat portion 220 and a second backrest portion 230 may also be pivotally secured to the second seat portion 220 or otherwise attached to the second seat portion 220 in a manner that permits selective rotation of both portions relative to one another (see FIG. 7). Additionally, a back surface of each of the first backrest portion 130 and the second backrest portion 230 may be releasably attached. Furthermore, as illustrated in FIG. 7, a plurality of pockets 200 may be secured to the first seat portion 120 and/or the second seat portion 220. In this manner, the child seat 10 may function as a double occupancy convertible child seat. Additionally, in some embodiments, a plurality of pockets (not shown) may be secured to the first backrest portion 130 and/or the second backrest portion 230

In some embodiments, the backrest portion 30 may include a headrest separate from the handle 40. In some embodiments, the headrest may be attached to an upper end of the backrest portion 30. In such embodiments, the headrest is attached to a frame extending upwardly from the upper end of the backrest portion 30. In various embodiments, the headrest may be adjustable in height relative to the backrest portion 30. In various embodiments, the headrest may be collapsible.

Exemplary Method of Use

Figure 8:
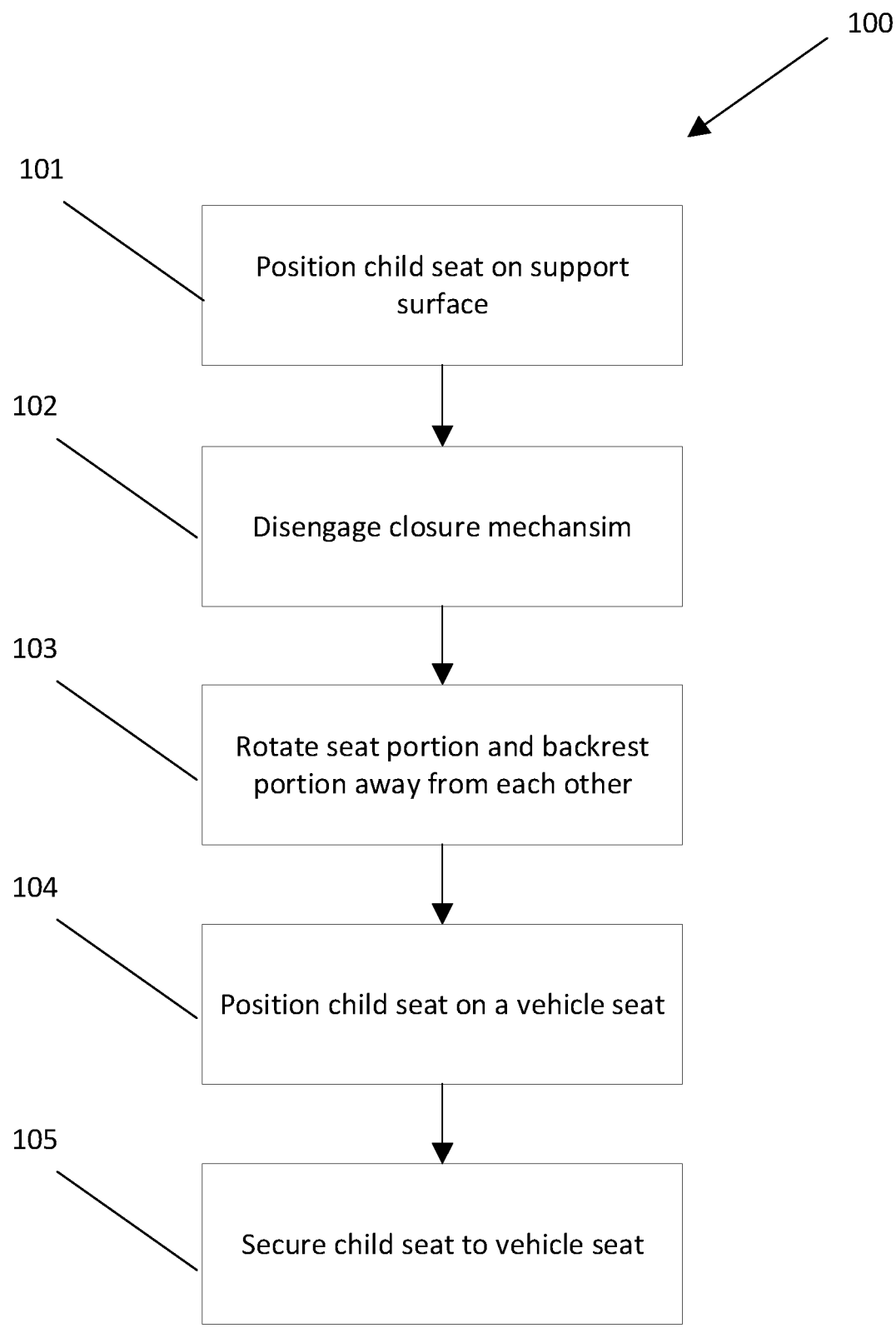
FIG. 8 is a flow chart illustrating a method of use of the convertible child seat from a folded orientation according to one embodiment of the present disclosure.
Figure 9:
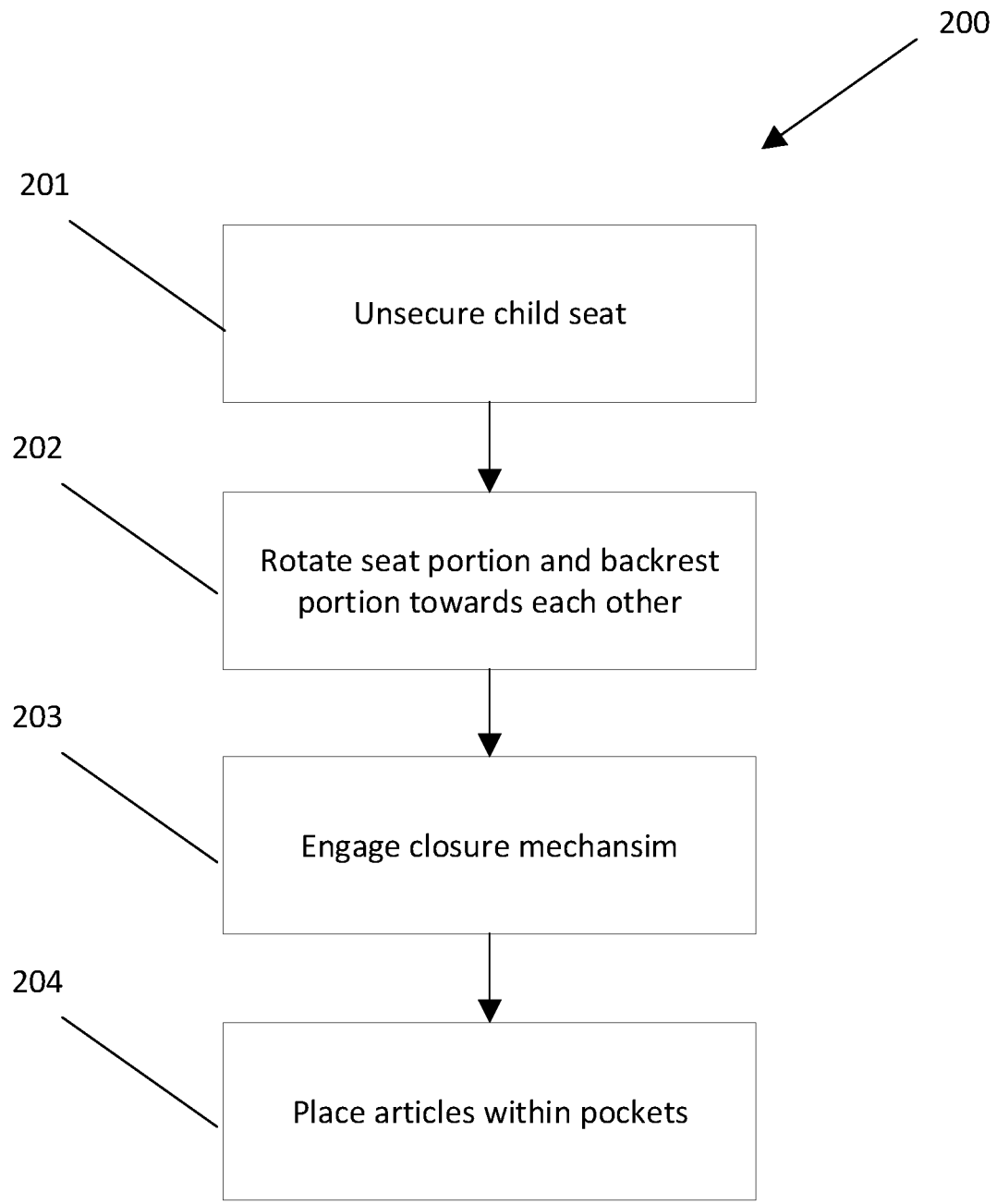
FIG. 9 is a flow chart illustrating a method of use of the convertible child seat from a deployed orientation according to one embodiment of the present disclosure.

FIG. 8 and FIG. 9 illustrate methods of use of the child seat 10. It should be understood that one or more of the plurality of steps illustrated therein may according to various embodiments be interchangeable and/or optional.

FIG. 8 illustrates the steps of unfolding the child seat 10 from its folded orientation as a child supply bag to its deployed orientation as a child seat to be secured to a vehicle seat. According to various embodiments, the child seat may be provided in its folded orientation. With reference to step 101, according to various embodiments, the child seat 10 may be positioned on a support surface. With reference to step 102, according to various embodiments, the closure mechanism 27 securing the seat portion 20 and the backrest portion 30 to each other may be disengaged or otherwise opened such that the seat portion 20 and the backrest portion 30 may be rotated relative to one another. With reference to step 103, in various embodiments, the seat portion 20 and the backrest portion 30 may be rotated away from one another. In some embodiments, the seat portion 20 may be rotated away from the backrest portion 30, such that the seat portion 20 and the backrest portion 30 are at an angle between 90 degrees and 180 degrees relative to one another. For example, the seat portion 20 may be rotated away from the backrest portion 30, such that the seat portion 20 and the backrest portion 30 are substantially perpendicular relative to one another. With reference to step 104, the child seat 10 may be positioned on a vehicle seat such that the lower surface 23 of the seat portion 20 rests on the vehicle seat (not shown). With reference to step 105, in various embodiments, the child seat may be secured to a vehicle seat. In various embodiments, a vehicle seat belt is threaded through the back surface of the backrest portion 30 to secure the child seat 10 to the vehicle seat.

FIG. 9 illustrates the steps of folding the child seat 10 from its deployed orientation as a child seat to be secured to a vehicle seat to its folded orientation as a child supply bag. According to various embodiments, the child seat 10 may be provided in its deployed orientation. With reference to step 201, according to various embodiments, the child seat 10 may be unsecured from a vehicle seat. It should be understood that this step may not be necessary if the child seat 10 is not secured to a vehicle seat or other support. With reference to step 202, the seat portion 20 and the backrest portion 30 may be rotated towards each other, such that the seat portion 20 and the backrest portion 30 are collapsed proximate to each other to form a compact unit. With reference to step 203, the closure mechanism 27 may be engaged or otherwise closed, such that the seat portion 20 and the backrest portion 30 are secured to each other. With reference to step 204, articles (e.g., child supplies) may be placed in the plurality of pockets.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A convertible child seat comprising:
   a seat portion configured for receiving the bottom of a child;
   a backrest portion configured for supporting the back of the child, the backrest portion being pivotally secured to an end of the seat portion and extending upwardly therefrom;
   a plurality of pockets, the plurality of pockets being secured to the seat portion, wherein, the child seat is operable between a deployed orientation as a child seat to be secured to a vehicle and a folded orientation as a child supply bag; and
   a handle removably attachable to a front surface of the backrest portion to serve as a headrest when the child seat is in the deployed orientation and removably attachable to an upper end of the backrest portion to allow a user to grip and pull the child seat when the child seat is in the folded orientation, wherein the handle is configured to function as a solar panel.

2. The child seat of claim 1, further comprising a harness secured to the backrest portion of the child seat.

3. The child seat of claim 2, wherein the harness includes a first harness strap and a second harness strap extending from the front surface of the backrest portion.

4. The child seat of claim 3, wherein the first harness strap and the second harness strap are removable.

5. The child seat of claim 4, wherein the first harness strap and the second harness strap are configured to be attachable to a back surface of the backrest portion, wherein the first harness strap and the second harness strap may each serve as a shoulder strap.

6. The child seat of claim 1, further comprising a plurality of wheels operatively coupled to a lower end of the backrest portion to allow the user to roll the child seat on a ground.

7. The child seat of claim 1, wherein the handle comprises a padding having a fastener member configured to be attached to a corresponding fastener member disposed on the front surface of the backrest portion, wherein the padding may serve as the headrest for a child positioned within the child seat.

8. The child seat of claim 1, further comprising a pair of detachable arm rests attached to the seat portion.

9. The child seat of claim 1, wherein the seat portion defines at least one cup holder recess.

10. The child seat of claim 1, wherein a fastener is disposed between the seat portion and the backrest portion for selectively securing the child seat in a folded state when in the folded orientation.

11. The child seat of claim 1, wherein the plurality of pockets each comprise a plurality of attached panels defining an interior storage space having an access opening.

12. The child seat of claim 1, wherein at least one of the plurality of pockets either includes a detachable outside layer or is lined with insulating material.

13. The child seat of claim 1, wherein the seat portion comprises a front wall, a back wall, a right side wall, and a left side wall, wherein a first left pocket is disposed on the left side wall, and a first right pocket is disposed on the right side wall.

14. The child seat of claim 13, wherein the right side wall comprises a second right pocket disposed on the first right pocket.

15. The child seat of claim 13, wherein the upper, lower, left side, and right side walls of the seat portion collectively define an interior storage compartment.

16. The child seat of claim 1, wherein the backrest portion includes at least one pocket disposed thereon.

17. The child seat of claim 1, wherein the handle defines an interior storage compartment.

18. A convertible child seat comprising:
   a seat portion configured for receiving the bottom of a child;
   a backrest portion configured for supporting the back of the child, the backrest portion pivotally secured to an end of the seat portion and extending upwardly therefrom;
   a plurality of pockets, the plurality of pockets being secured to the backrest portion, wherein, the child seat is operable between a deployed orientation as a child seat to be secured to a vehicle and a folded orientation as a child supply bag; and
   a handle removably attachable to a front surface of the backrest portion to serve as a headrest when the child seat is in the deployed orientation and removably attachable to an upper end of the backrest portion to allow a user to grip and pull the child seat when the child seat is in the folded orientation, wherein the handle is configured to function as a solar panel.

19. A convertible child seat comprising:
- a seat portion configured for receiving the bottom of a child;
- a backrest portion configured for supporting the back of the child, the backrest portion being pivotally secured to an end of the seat portion and extending upwardly therefrom;
- a plurality of pockets, the plurality of pockets being secured to the seat portion; and
- a harness attachable to a back surface of the backrest portion of the child seat, the harness comprising a first removable harness strap and a second removable harness strap extending from a front surface of the backrest portion such that the first removable harness strap and the second removable harness strap may each serve as a shoulder strap,
- wherein the child seat is operable between a deployed orientation as a child seat to be secured to a vehicle and a folded orientation as a child supply bag.

\* \* \* \* \*